Sept. 8, 1931.    S. B. DRUCKER    1,822,275
APPARATUS FOR MAKING EMULSIONS
Filed Oct. 19, 1928    2 Sheets-Sheet 2
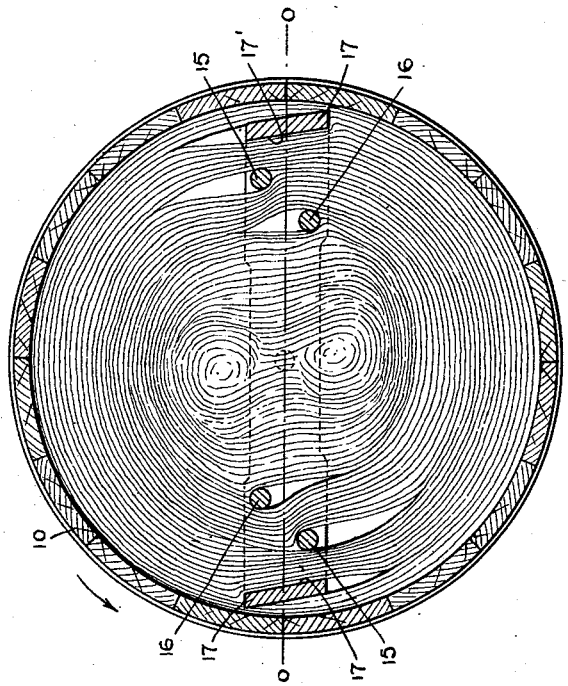
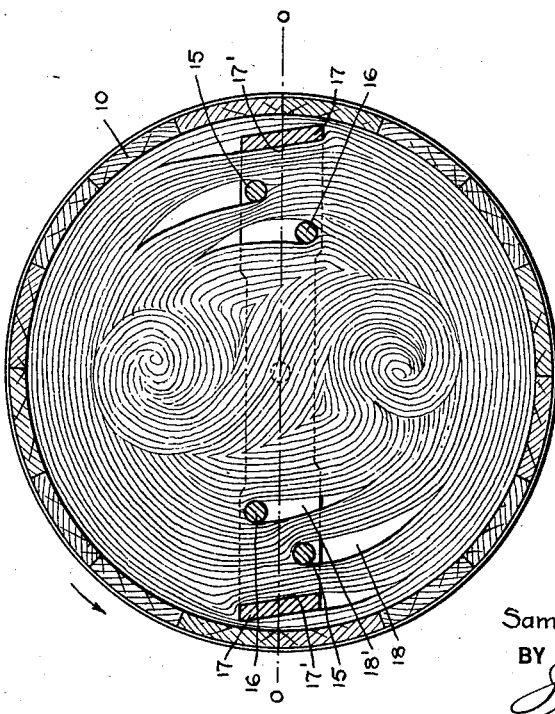
INVENTOR
Samuel B. Drucker
BY
ATTORNEY Patented Sept. 8, 1931

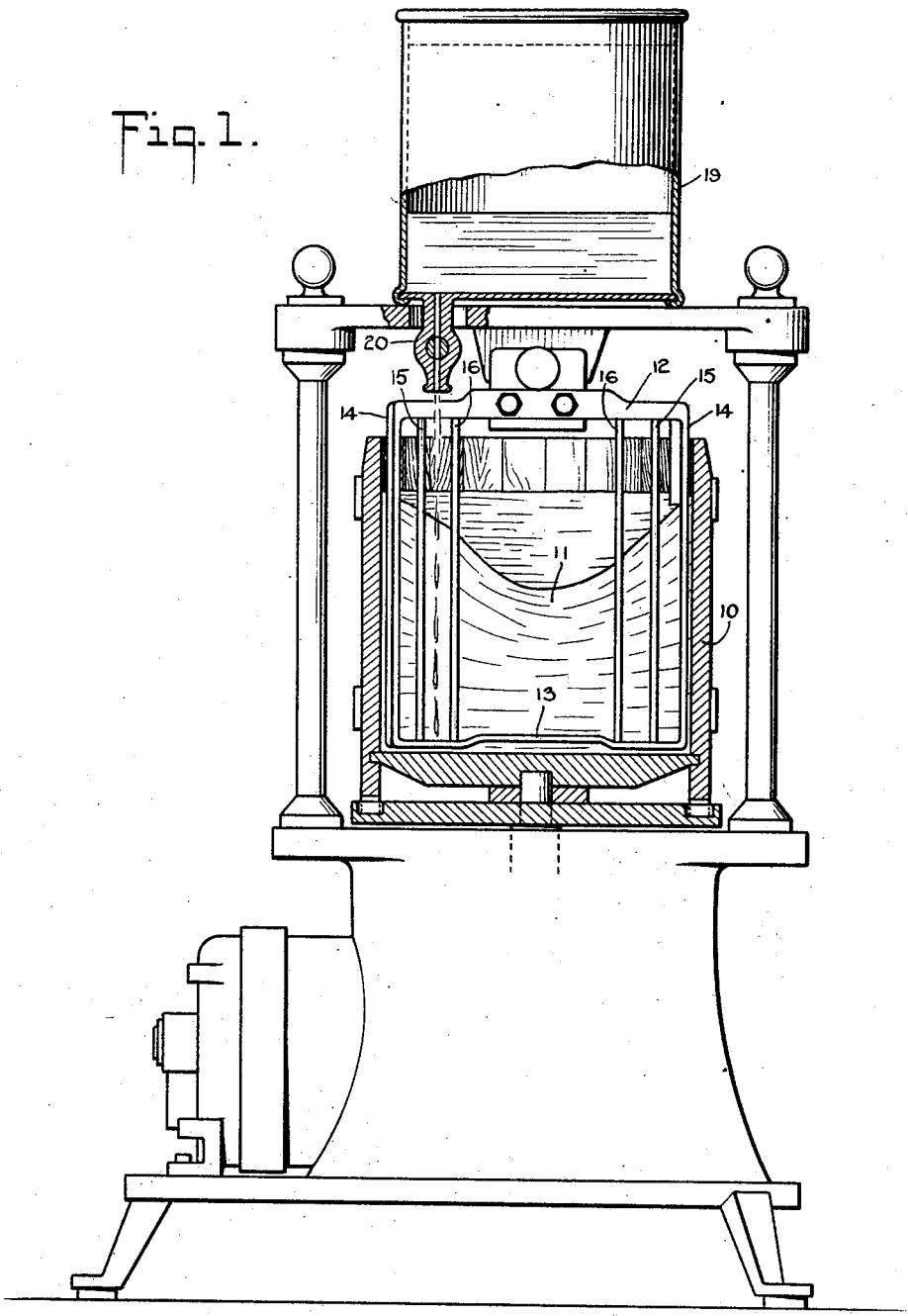

1,822,275

UNITED STATES PATENT OFFICE

SAMUEL B. DRUCKER, OF BROOKLYN, NEW YORK

APPARATUS FOR MAKING EMULSIONS

Application filed October 19, 1928. Serial No. 313,481.

My invention relates to a method for making mayonnaise and apparatus therefor. My invention particularly relates to a method of making mayonnaise in large quantities and which may be referred to as automatic mayonnaise manufacture.

Where I have attempted to make mayonnaise or similar emulsions of ingredients including edible oils, eggs, or the equivalent emulsifying agents, by adding the oil component to a batch or batter and crushing up the oil, by whirling and interweaving the cross-currents in the body of the batch, I have obtained uniform results and a fair degree of emulsification. A form of apparatus found suitable for practice of the method includes centrifugally whirling the batch forming the ingredients in a rotary vessel, preferably made of wood, and deflecting by stationary obstructions the streams formed by the whirling mass, thus serving to break up the mass into streams and distribute the same to effect a crushing or breaking up of the oil particles and evenly distribute the particles so made in the other ingredients to provide an emulsion which is free from any undesirable, distinctly oily taste. I have further utilized such fixed obstructions in the path of movement of the swirling mass as the means to add the oil or vinegar component, thus utilizing the best means by which I may evenly and uniformly distribute the newly added ingredients and more quickly disseminate the same to completely effect the desired result of thorough and uniform distribution. Thus by utilizing a stationary frame including side portions for peripherally breaking down the mass and inwardly deflecting portions of the stream for further admixture thereto of additional ingredients, by the aid of intermediate obstructing members in the form of rods, the deflecting side portions and obstructions serve not only as the addition point of the additional ingredients but as the determining factor as to the form of the streams of the swirling mass. I have previously arranged obstructing members relatively to the deflecting member to form the swirling mass with interiorly directed streams and obstructions to form the voids, arranging the obstructions in substantially radial alignment, with the result that the streams deflected interiorly were further interiorly directed by the obstructing members forming the primary voids. The result of the action thus obtained from the deflecting member and the obstructions offers no difficulty during the early stages of emulsification, when the ingredients are in a high state of fluidity and do not materially affect the emulsification or the manner in which the additional agents may be added. However, in the later stages of the process, where the emulsion takes on more rigid character, the location of the void forming members becomes of primary importance, as the relative movement of the streams of the swirl slows down. This is also true where the character of the emulsion made, due to the quantum of ingredients used, provides a rigid or semi-solid emulsion. Thus, in the manufacture of mayonnaise, where at the beginning of the process and with incomplete emulsification the swirling mass has a high degree of fluidity, at the end of the process the emulsion assumes a rigidity approaching soft butter. At such stage of the process the character of the streams from the deflecting member and the void forming member is changed from that at the beginning of this process as to require a change in the place for the addition of the final quantities of oil or final quantities of vinegar, when mayonnaise is made. This change not only requires careful attention on the part of the operator but, if not followed, tends to cause the emulsion thus far made to "break" by coalescence of some of the particles into objectionable, larger particles. Thus, intensification of the swirling action is apt to defeat the very purpose of the process and destroy the fine emulsification accomplished at the early stages. I have found that I may overcome the detrimental effect of the thickening formation due to intense emulsification and that I may be assured of avoiding the breaking or coalescence of emulsion particles by so disposing the stream deflecting members and void forming members to obtain an attenuation of the particles to complete the emulsification rather than impinging streams of the emulsion, tending to produce breaking or coalescence of the emulsified ingredients. I have further found that I may prevent breaking or coalescence of the oil particles of the mayonnaise batch, particularly at the later stages of the process, when the emulsion assumes greater rigidity or where an emulsion or mayonnaise batch is made of highly thick character by maintaining a rather definite stream deflecting area and void formation area to thereby assure that streams of emulsified or partially emulsified ingredients do not undesirably impinge against each other or that the freshly added materials, particularly the oil, are constantly attenuated to facilitate the emulsification and break down the ingredients as quickly as they are added to the batch.

My invention therefore has for an object thereof the provision of a method of making emulsions, such as mayonnaise, by centrifugally swirling portions of the ingredients to form a batch to produce whirling, interweaving, cross streams and adding the components, such as oil, to crush and break up the particles, to distribute the same uniformly throughout the batch, the whirling, interweaving cross currents being so formed as to tend to attenuate the particles into smaller ones, without forming any undesirable streams or currents which impinge the particles against each other, tending to coalesce globules of the material or cause the emulsion to break, particularly when making emulsified products of high rigidity and/or when making mayonnaise in the later stages of the emulsification of the same.

It is a further object of my invention to provide a process of making mayonnaise which includes mixing together portions of the ingredients forming the batch and then whirling, interweaving cross currents, while simultaneously adding an oil ingredient, the process including so whirling, interweaving the cross currents in the body of the batch whereby the particles of oil which are crushed or broken up, will persist and continue to be so broken up, even with increased solidification of the emulsion, eliminating any undesirable tendency of the cross currents to impinge and cause the particles to break or coalesce.

It is a still further object of my invention to provide a process for the manufacture of mayonnaise comprising mixing together portions of the ingredients forming the batch to produce whirling and interweaving of cross currents in the body of the batch and forming voids whereby small increments of oil may be added at the bottom portion of the body of the batch whereby the particles of oil are crushed and broken up and are uniformly distributed, the process including means to so produce the whirling and interweaving of the cross currents and the voids whereby the voids will be substantially definitely located in the batch and impinging currents tending to cause breaking of the emulsion or coalescence of the emulsified particles will be avoided. It is a still further object of my invention to provide apparatus for making emulsions, particularly mayonnaise, which includes a batch centrifuging vessel for whirling and interweaving a portion of the batch into cross currents and also forming well defined voids, and includes means for adding another component, such as oil, in relatively small increments within the vessel wherein the voids will be formed, the means for the whirling or interweaving being disposed to leave no undesirable impinging cross currents and substantially definitely position the voids under wide variations of condition of the ingredients, ranging from fluidity to solidity.

Other objects of my invention include the provision of a process for emulsifying the ingredients, such as the batch, for making mayonnaise, which may quickly and with certainty and uniformity emulsify without any tendency to cause the emulsion to break or have the particles thereof coalesce.

To attain these objects and such further objects of my invention as may appear herein or be hereinafter pointed out, I make reference to the accompanying drawings, which will serve to illustrate my process as well as define one embodiment of my apparatus, which may be used to practice the process.

Figure 1 illustrates my device in side elevation, with portions in longitudinal section to illustrate the details;

Figure 2 is a horizontal section through the vessel at an early stage of the operation;

Figure 3 is a view similar to Figure 2, showing the action at or near the stage of completion of the operation.

In the manufacture of mayonnaise, as previously practiced by me and particularly set forth in my application S. N. 550,681, filed April 8, 1922, I have described the preferred method employed by me for making mayonnaise from ingredients such as fresh eggs, salt, pepper, mustard, sugar, vinegar and a suitable edible oil. These comprise the general ingredients of the mayonnaise batch and in my preferred process, the eggs are first broken into a suitable container and beaten up to form a substantially uniform mixture, particularly where I use the yolk and albumen. The egg component has added thereto the desired condiments, to effect a uniform mixture of the same, and while thoroughly mixing and agitating the eggs, preferably with the condiments, the oil component is gradually added. Of vital importance to my process is the manner in which the oil is added, to wit, in small amounts and at approximately the lower part of the mass in the container. To accomplish this, I impart a whirling, centrifugal movement to the mass which is to receive the oil and crush and break up the particles of the oil and thoroughly distribute the same throughout the mass of the batch by whirling and interweaving cross currents in the body of the batch by forming suitable obstructions, behind which voids are formed, at which place I cause oil to be added in small amounts, to thereby reach the bottom of the mass. The centrifugal whirling tends to outwardly direct currents of the mass. I therefore cause interweaving cross currents by inwardly deflecting the mass. The joint action of the void forming obstructions and the inwardly deflecting means presents the batch in a condition whereby the oil particles are gradually broken down into final globules and at the same time evenly distributed through the egg component. I have found that where this action is conducive to rapidly producing a thorough emulsification of the oil at the early stages of the process, it is not entirely satisfactory as the emulsification nears completion and greater solidity, particularly where it has been found desirable to include a larger egg component or equivalents thereof, to produce a product which has a buttery consistency. I have found it desirable that as the emulsification proceeds and the mass increases in solidity or when operating with components which will obtain solidity at the early stages, that the whirling of the mass and cross weaving must have the currents directed to produce attenuation and prevent the cross currents from impinging. Thus, the whirling mass as produced by centrifugal action has formed interweaving cross currents by inwardly deflecting the outwardly centrifuged mass. I have found it further desirable to form voids, at which point the oil component is gradually added and when operating as described, that is, to continue the emulsification action to produce greater solidity of the emulsion, to so form the voids that an attenuation is immediately obtained and due to greater solidity of the mass, there will be a definite position of the voids, avoiding any tendency to cause cross currents to undesirably impinge. Thus, by attenuating the inwardly deflected whirling cross currents and avoiding undesirable impingement of cross currents, the globules of oil in the batch will not break or coalesce. By this method of swirling the batch, the oil particles continue to be crushed and broken up and evenly and uniformly distributed throughout the emulsifying ingredient, such as the egg component, even though the whirling and interweaving currents tend to slow up due to solidification of the emulsion and, furthermore, the breaking up and emulsifying process may be continued to form minute or colloidal globules of oil, even with a substantially solidified mayonnaise batch, without danger of causing the particles to impinge to an extent where they will break or coalesce and thereby give a distinctly oily characteristic to the mayonnaise batch. Furthermore, by attenuating the cross current of material, the voids that are formed, at which point the additional oil component is added, may be maintained substantially constant, even though solidification is approached and the speed of the cross currents tends to be retarded.

My process above described may be carried out in apparatus described in my application above referred to with modification to obtain the desirable result indicated. This is accomplished by suitably rotating a container 10, in which the batch 11 is disposed. The container is preferably made of wood or like amalgamating material described in my companion application, S. N. 148,336, filed November 15, 1926. By axially revolving the container, the mass 11 partakes of the revolving movement of the container and hence a swirling movement under the influence of centrifugal force is imparted to the mass. The swirling movement relatively to the bottom and side walls of the container, particularly where the same is made of wood or similar amalgamating material, assists in the breaking down of the ingredients and where oil is a component and this is gradually added, the particles will be crushed, broken down and distributed throughout the mass of the batch, tending to produce emulsification. I may redirect the outwardly moving mass by interposing a fixed or stationary obstruction or obstructions in the path of the swirling mass. A simple arrangement is shown wherein a frame of generally rectangular shape is employed consisting of the upper and lower members 12 and 13, which are connected together by the side portions 14 and include intermediate rods 15 adjacent the arms 14 and the rods 16 interiorly thereof, each being included to opposite sides of the diametrical line of reference O—O. The frame thus described is suitably held stationary with reference to and positioned within the container 10. I prefer that the stationary frame shall extend diametrically across the container 10 and to form the side members 14 in slightly inclined relation so as to enable the edges 17, towards which the swirling mass approaches, to lie closer to the interior surface of the container 10 than any other part of the stationary frame and to form of the surface 17' an interiorly directing deflecting area. I coordinate with the side members thus described two sets of obstructing members 15 and 16, in the form of the intermediate rods previously described, each of which is placed at opposite sides of the diametrical center line O—O, as previously described. Thus, with the rotation of the vessel, the intermediate rod 16 will be in advance of the intermediate rod 15 and nearer the center of the container. With axial rotation imparted to the container in the direction of the arrows, the batch contained therein is carried with it in a like direction. On encountering the side arms 14 of the stationary portion, and particularly the edges 17 thereof, that portion of the batch which is in contact with or in proximity to the inner wall of the container and which is moving at the same rate of speed as that of the container is peripherally scraped off from the inner surface to an extent permitted by the clearance between the edges 17 and the inner wall of the container and is deflected slightly inwardly by the inner inclining wall 17' thereof, to divide the mass into streams, deflected inwardly, which reunite substantially at the center, before again being outwardly centrifuged to the periphery or the interior wall of the container.

The intermediate rods 15 and 16 form obstructions which produce divided streams in the whirling mass and also exert a more or less retarding action on the speed of the whirl thereof, forming well-defined voids or spaces 18 and 18'. It will be observed that the mass is reunited and the voids 18 and 18' are controlled by the speed of rotation and the general character of the mass. It will be further observed that the intermediate rods 15 and 16 have their center lines so positioned as to be inclined oppositely to that of the inclined surface 17'. The movement of the stream against the deflecting surface 17' and the obstructions 15 and 16, coupled with the relative movement of the material to the walls of the vessel result in the breaking or crushing of the mass.

While the mass is undergoing this treatment, the increments of additional agents, such as oil and vinegar, preferably in the order stated, are added from a supply vessel 19, disposed immediately over the rotating vessel through the spigot 20, this being so positioned as to drip the material into the void 18, it being proposed to so rotate the vessel 10 that this void extends substantially to the bottom of the container. The oil component is gradually added to the egg component or its equivalent and as it is added, is gradually broken down into particles which are disseminated through the batch which, upon repeated contact with the surface of the container obstructions, tends to complete the emulsification.

The whirling action and interweaving cross stream effects produced are not only distinctive but vary in characteristics as the emulsifying action progresses, and as the mass of the batch increases, with the continued supply of the oil content and with the supply of the vinegar content, as each of the ingredients performs its emulsifying action. In the early stages of the operation, distinct whirls of considerable area are formed and as the mass has some degree of fluidity, the voids 18 and 18' are of considerable size. With increased solidity, due to emulsification or the chemical action of the ingredients, the character of the whorls and the voids changes. Figures 2 and 3 each show the different characters of the interweaving streams at the early stage and later stages of the process. By disposing the rods 16 in advance of the rods 15, as they impinge the approaching mass, the stream is deflected outwardly towards the rods 15. Between the deflecting member and the rods 16, a portion of the stream is drawn and encounters the rods 15. The result at later stages of the process or with greater solidification of the mass, produces an attenuation of the stream and a constancy of the void 18 which, as it will be understood, occurs at opposite sides of the frame.

By this arrangement I am enabled to carry out the process previously described of forming the whirling, interweaving currents in the body of the batch, deflecting them inwardly and attenuating the same while obtaining a substantially constant and definitely positioned void for the addition of increments of oil or vinegar and completion of the emulsion thoroughly.

Thus, I may not only obtain a better attenuation of the ingredients, tending to break down the particles of oil but the cross currents or streams are so directed as to be prevented from impinging against other portions of the mass, in a manner tending to cause the particles of oil to break and coalesce. Maintaining a substantially, constantly positioned void for the addition of the oil or the vinegar component assures that the material immediately strikes the bottom portion of the body of the batch, to be crushed and broken up and uniformly distributed into the body of the mass.

My process and the preferred apparatus above described further permit the production of an emulsified mass, such as mayonnaise, having greater solidification and refinement of the microscopic globules of oil, the same being capable of production within a comparatively short period of time, with certainty and minimum exercise of attention of an operator.

Having thus described my invention and illustrated its use, what I claim as new and desire to secure by Letters Patent, is—

1. In combination with emulsifying apparatus for the manufacture of mayonnaise including a rotatable container for whirling a batch of the ingredients, of a stationary member adapted to be retained within said container during rotation thereof, including an angularly disposed portion adapted to inwardly deflect a portion of the batch from the periphery of the container, an obstructing member rearwardly of said deflecting portion arranged to form a well defined void of the approaching stream of the batch and another obstructing member in advance of said first obstructing member arranged to maintain the void formed by the obstructing member substantially definitely located.

2. In combination with emulsifying apparatus for the manufacture of mayonnaise including a rotatable container for whirling a batch of the ingredients, of a stationary member adapted to be retained within said container during rotation thereof, including an angularly disposed portion adapted to inwardly deflect a portion of the batch from the periphery of the container, an obstructing member rearwardly of said deflecting portion arranged to form a well defined void of the approaching stream of the batch and another obstructing member in advance of said first obstructing member arranged to maintain the void formed by the obstructing member substantially definitely located and means for adding increments of oil at the void so formed.

3. In combination with emulsifying apparatus for the manufacture of mayonnaise including a rotatable container for whirling a batch of the ingredients, of a stationary member adapted to be retained within said container during rotation thereof, including an angularly disposed portion adapted to inwardly deflect a portion of the batch from the periphery of the container, an obstruction member rearwardly of said deflecting portion arranged to form a well defined void of the approaching stream of the batch and another obstructing member in advance of said first obstructing member arranged to maintain the void formed by the obstructing member substantially definitely located, means for retaining a container for oil or the like including a discharge member for directing the liquid contents thereof in the void formed by said obstructing member.

In witness whereof I have hereunto signed my name this 16th day of August, 1928.

SAM'L B. DRUCKER.